(12) United States Patent
Hugosson et al.

(10) Patent No.: US 10,834,093 B2
(45) Date of Patent: Nov. 10, 2020

(54) RESTORE OF HEADLESS ELECTRONIC DEVICE

(71) Applicant: Axis AB, Lund (SE)

(72) Inventors: Fredrik Hugosson, Lund (SE); Stefan Lundberg, Lund (SE)

(73) Assignee: AXIS, Lund (SE)

( * ) Notice: Subject to any disclaimer, the term of this patent is extended or adjusted under 35 U.S.C. 154(b) by 140 days.

(21) Appl. No.: 15/692,322

(22) Filed: Aug. 31, 2017

(65) Prior Publication Data

US 2018/0063156 A1 Mar. 1, 2018

(30) Foreign Application Priority Data

Aug. 31, 2016 (EP) .................................... 16186642

(51) Int. Cl.
| | |
|---|---|
| *H04L 29/06* | (2006.01) |
| *H04L 9/32* | (2006.01) |
| *H04L 9/14* | (2006.01) |
| *H04L 9/30* | (2006.01) |
| *G06F 1/24* | (2006.01) |
| *G06F 21/44* | (2013.01) |
| *G06F 21/57* | (2013.01) |

(52) U.S. Cl.
CPC ............. *H04L 63/108* (2013.01); *G06F 1/24* (2013.01); *G06F 21/445* (2013.01); *G06F 21/572* (2013.01); *H04L 9/14* (2013.01); *H04L 9/30* (2013.01); *H04L 9/3247* (2013.01); *H04L 63/083* (2013.01); *G06F 2221/2153* (2013.01)

(58) Field of Classification Search
CPC ... H04L 63/108; H04L 9/3247; H04L 63/083; H04L 9/30; H04L 9/14; G06F 1/24; G06F 21/445; G06F 21/572; G06F 2221/2153
See application file for complete search history.

(56) References Cited

U.S. PATENT DOCUMENTS 5,175,766 A * 12/1992 Hamilton ............ G06F 21/6245
705/64
6,023,506 A * 2/2000 Ote ...................... G06F 21/6209
380/45

(Continued)

FOREIGN PATENT DOCUMENTS

WO 2009017577 A2 2/2009

OTHER PUBLICATIONS

EP 16 18 6442.1 European Search Report (dated Nov. 7, 2016).

*Primary Examiner* — Mohammad A Siddiqi
(74) *Attorney, Agent, or Firm* — Volpe Koenig

(57) ABSTRACT

A method for restoring a setting on a network connected device achieves increased security. The method includes receiving an initiation signal representing a request to restore the setting on the device; transmitting a request for authorization to restore the setting to an authorization device arranged as an adjacent node on the network by transmitting the request for authorization over a link layer protocol, wherein the request is transmitted in response to the received initiation signal; receiving an encrypted restore authorization response from the authorization device in response to the request for authorization; decrypting, if encrypted, the received restore authorization message; verifying the restore authorization message; and restoring the settings on the network connected device if the restore authorization message was verified.

20 Claims, 2 Drawing Sheets

(56) References Cited

U.S. PATENT DOCUMENTS

| | | | |
|---|---|---|---|
| 8,838,966 B2* | 9/2014 | Tolle | G06F 3/04847 713/155 |
| 2003/0005294 A1 | 1/2003 | Gougeon | |
| 2007/0007114 A1 | 1/2007 | Liu et al. | |
| 2008/0022061 A1* | 1/2008 | Ito | H04N 21/4147 711/162 |
| 2008/0046982 A1 | 2/2008 | Parkinson | |
| 2008/0059623 A1* | 3/2008 | Yang | H04L 41/0213 709/223 |
| 2008/0263132 A1* | 10/2008 | Saintloth | G06F 17/289 709/203 |
| 2008/0266402 A1* | 10/2008 | Wu | H04L 29/12216 348/207.1 |
| 2010/0031058 A1* | 2/2010 | Kito | G06F 11/1435 713/193 |
| 2010/0280635 A1* | 11/2010 | Cohn | G08B 29/02 700/90 |
| 2011/0019816 A1* | 1/2011 | Inami | G06F 21/608 380/28 |
| 2011/0037992 A1* | 2/2011 | Kato | G03G 15/50 358/1.13 |
| 2012/0113265 A1* | 5/2012 | Galvin | H04N 7/181 348/159 |
| 2014/0094158 A1* | 4/2014 | Maeda | H04W 8/22 455/418 |
| 2015/0281218 A1 | 10/2015 | Bowser et al. | |
| 2015/0309761 A1* | 10/2015 | Hirakawa | G06F 3/1222 358/1.15 |
| 2016/0127875 A1* | 5/2016 | Zampini, II | H04W 4/043 370/311 |
| 2016/0142263 A1* | 5/2016 | Erdmann | H04W 8/005 455/41.2 |
| 2017/0026578 A1* | 1/2017 | Chen | H04N 5/23241 |
| 2017/0201782 A1* | 7/2017 | Lindsey | H04N 21/262 |
| 2019/0155697 A1* | 5/2019 | Li | H04W 4/80 |

* cited by examiner

RESTORE OF HEADLESS ELECTRONIC DEVICE

FIELD OF INVENTION

The present invention relates to a method for restoring an electronic device, and particular a headless electronic device such as a network camera.

BACKGROUND

A headless electronic device is an electronic device having a data processing capacity but lacking a graphical user interface, such as a display, and it may also lack means for communicating with the device directly, such as a keyboard. Examples include network attached storage (NAS), routers, IP-cameras etc. and more examples are given in the specification to follow. Although in the present disclosure the invention will be described mainly in the area of video monitoring and physical access control, the skilled person realizes that it may be used for other headless devices.

A headless device may be accessed via a cable or wireless communication for the purpose of control and setup. Furthermore, for increased reliability there is often a physical switch for the purpose of restoring the headless device to factory default settings or other predefined restore settings. The physical switch may be a dedicated button, but it may also be one or more buttons combined with a particular pressing pattern, or a magnetic switch accessible with a magnetic key.

A common reason for initialization a restore is that a password has been lost or that the configuration of the headless device has entered an unwanted state where a restore is preferable over a manual reconfiguration, or where a restore is the only option.

The headless device may be electronically protected in the sense that not anyone could connect to the device and altering its settings. This may be accomplished using a suitable set of certificates, passwords etc. The physical restore is however a way of circumventing the regular communication with the device in that it is designed to provide a solution in case of a failure of such communication. For some headless devices it is thus sufficient to physically access the headless device to enable access to a factory restore, and once the factory restore is initialized it may be possible to hijack the device by altering its settings and thereby cancelling a user-specific password to a default password. Such a cancellation is often a part of the restore process itself.

Existing solutions for addressing the above problems include physical locks, such as the one disclosed in US2007/007114A1 where a restore button of a router is protected by a lockable cover. Using a physical lock introduces demands on the durability of the device onto which it is arranged, and consequently it may not be used for any device and in a retrofittable manner, at least not to a full extent. This issue is partially circumvented by the disclosure of US2003/0005294A1, where a smart card and using an optional pin code is used for restoring or clearing a secured terminal.

In a worst case scenario any individual having physical access to the product would have the opportunity to hijack the headless device, enabling access to recorded data (video), alteration of settings, etc. Such a scenario is unlikely, especially considering that it would have to remain undetected by the rest of the system, but improvements may still be valuable.

SUMMARY

In view of the above, an improved method and device for restoring of a headless electronic device to a factory default setting are provided.

According to a first aspect of the teachings, a method for restoring a setting on a network connected device, comprises:

receiving an initiation signal representing a request to restore the setting on the device;

transmitting a request for authorization to restore the setting to an authorization device arranged as an adjacent node on the network by transmitting the request for authorization over a link layer protocol, wherein the request is transmitted in response to the received initiation signal;

receiving a fully or partially encrypted restore authorization message from the authorization device in response to the request for authorization;

decrypting the received restore authorization message;

verifying the restore authorization message;

restoring the settings on the network connected device if the restore authorization message was verified.

The method adds a security feature ensuring that the restore is initiated by an authorized individual, which is a particularly important feature since following a restore any person could gain access to the network connected device. The restore authorization message could be fully encrypted, but in most cases it will be sufficient to be able to ensure that the message emanates from an authorized source. An alternative to full encryption is then to perform a partial encryption of the message, such as for example adding a digital signature to it. Effects and advantages with communication via a link layer protocol, i.e. a method enabling addressing a device directly with its Ethernet address, will be discussed in the detailed description.

In a further embodiment the authorization request could be fully or partially encrypted.

In one or more embodiments the initiation signal may be triggered by the actuation of a restore initiation mechanism arranged on the network connected device, while in other embodiments the initiation signal is triggered by actuation of a restore initiation mechanism arranged on the authorization device. In a practical setup these possibilities may be combined, such that a user may select the most convenient solution.

In one or several embodiments the network connected device may be arranged to communicate with a dedicated authorization device only. This may be ensured by arranging matching certificates or a pair of public/private encryption keys on the network connected device and the authorization device, respectively. Another option may be to include a password or an identification code that should be entered at the authorization device and sent to the network connected device in order to fully authorize a restore operation. The identification code may be a password, and it may also include a profile identifier identifying the type of restore operation to be conducted.

In one or more embodiments the method may include accessing the authorization device with an external device. This would enable the use of a more complex user interface, which may be beneficial if more complex operations are to be conducted.

The profile identifiers may also include identifiers for several different network connected devices, enabling an extended use of a single authorization device.

In any embodiment the network connected device may be connected to the network via an Ethernet cable, preferably but not necessarily enabling power over Ethernet. Furthermore, the restore operation may comprise restoring the network connected device to a restore profile comprising a preset state for the network connected device, said preset state corresponding to a state in which it left a factory, or to such state altered by critical software updates, including a restore of a password for accessing the network connected device.

In one or several embodiments the method may comprise adding a password other than the factory default password. This may be performed by using the keypad or user interface of the authorization device or by having a preset on the network connected device. The result will be that when the restore process is finalized and the network connected can be accessed again, a password differing from the default password will be set. This will increase the security even further by closing the temporal gap during which the network connected device could be more vulnerable to unauthorized access.

According to a second aspect, the present teachings relate to an authorization device used in a method for restoring a setting on a network connected device. The authorization device comprises a controller, a non-volatile storage for software and certificates, a port for Ethernet communication, and optionally for power over Ethernet, and it is configured for communication with a network connected device via low level link layer packets.

In one or more embodiments the authorization device may comprise an indicator for indicating a status of a restore process. It could as an example indicate successful pairing with the network connected device, a link contact, a PoE negotiation being ongoing or finalized, and/or that the restore process has been finalized.

In any embodiment, the authorization device may be powered via power over Ethernet or an internal battery. In the former case the authorization device may preferably be configured for tapping power from a Power over Ethernet (PoE) cable originally arranged for supply to the network connected device.

The authorization device may, in one or more embodiments thereof, comprise a restore initiation mechanism, optionally in direct communication with a restore initiation mechanism of a network connected device to be restored. Furthermore it may comprise a code entry device, such as a numeric keypad, for entry of an identification code or communication with the authentication device. The code entry device is preferably integrated in the authorization device, as a portion thereof.

The authorization device may comprise multiple Ethernet ports enabling communication with multiple network connected devices.

According to a third aspect the present teachings relate to a system for restoring settings of a network connected device, comprising the network connected device and an associated authorization device of any preceding or subsequent description. This aspect comprises several embodiments, e.g. the network connected device may be configured to perform the method according to one or any embodiment disclosed in the preceding or subsequent description.

It should be noted that the invention relates to all possible combinations of features unless explicitly stated otherwise.

BRIEF DESCRIPTION OF THE DRAWINGS

The above, as well as additional objects, features and advantages of the present teachings, will be better understood through the following illustrative and non-limiting detailed description of preferred embodiments, with reference to the appended drawings, where the same reference numerals will be used for similar elements, wherein.

DETAILED DESCRIPTION OF THE PREFERRED EMBODIMENTS

Figure 1:
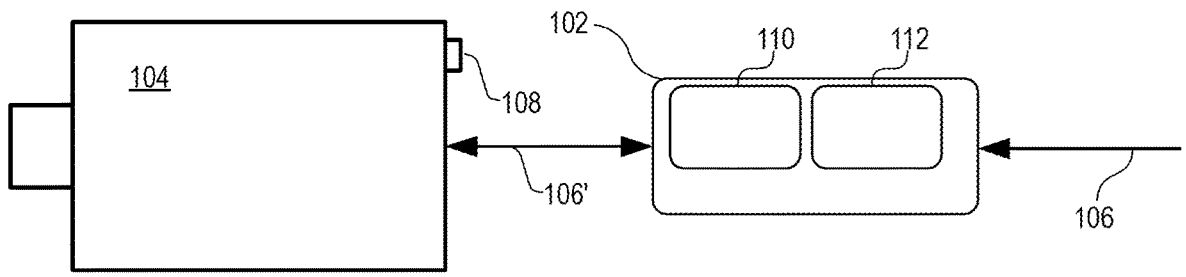
FIG. 1 is a schematic view of a network connected device with an authorization device connected to it.

FIG. 1 is a schematical view of an authorization device 102 connected to a network device 104, in this particular instance a network camera 104. The camera 104 is a headless device in the sense that it does not have a display for communication with an operator, though it may have a set of LEDs via which some degree of communication may be effected.

The camera 104 is connected to the Ethernet via an Ethernet cable 106, preferably also providing Power over Ethernet (PoE), enabling that only a single connector is available on the camera 104. The use of PoE has an immediate advantage in installation that only a single network cable has to be provided, since the Ethernet cable 106 communicates both power and enables transfer of information to and from the camera. A practical advantage may be that since the power to the product when using PoE does not count as high voltage, high voltage regulations do not apply and untrained personnel may work with the equipment and do the installation.

The setup shown in FIG. 1 also includes an authorization device 102 connected in series with the camera 106, immediately upstream thereof. Effectively, the Ethernet cable leading 106 to the camera has been disconnected and connected to the authorization device 102 instead, and a further cable also defined by 106' now connects the authorization device 102 and the camera 104.

When PoE is used, the authorization device 102 may preferably bypass power via the Ethernet cable so that the power supply to the camera 104 is maintained, and may also maintain data transfer to and from the camera 104. In one or several embodiments data transfer to and from the network connected device via the authorization device is blocked during a restore process, such as to prevent unauthorized access immediately after restore is performed.

The authorization device 102 may tap power for its own function from the Ethernet cable 106, yet it may also have a separate power supply or be provided with an internal power supply, such as a battery. Tapping power from the Ethernet cable has an advantage in that the components included in the authorization device may be kept at a minimum. Using an internal battery or another power source could also have some advantages. One advantage is that use would not be limited to devices being powered with PoE. In such embodiments the authorization device would only need an Ethernet connection to connect to the network connected device, rather than a pass-through port.

In another embodiment where the camera is powered by an external source other than PoE, the authorization device may be powered via the camera, e.g. via an Ethernet cable 106' leading from the camera 104 to the authorization device 102 or via a separate connection. An alternative to connecting the authorization device to the camera via an Ethernet cable would be to use wireless communication. Such an approach may be beneficial from a flexibility viewpoint, since access may be provided without connecting to the camera physically. This may, however, also be considered to be a weakness from a security perspective.

Returning to FIG. 1 the camera 104 is provided with a restore button 108. In this context it is important to note that the restore button 108 represents a function rather than a physical button. The restore button may be a dedicated restore button 108, but it may also be one or several general purpose buttons which when pressed according to a particular sequence initializes a restore. In other embodiments the restore button may be magnetically or electronically actuated, giving the advantage that the button may be concealed inside a camera housing, protected from the environment and to some extent from inadvertent actuation. In one or several embodiments, not shown, the restore functionality may be initiated using near-field communication (NFC), in which the camera would have to be provided with means for communicating using an NFC protocol.

The camera is provided with a functionality for factory restore, enabling a restore to a state corresponding to a state in which the camera left the factory, e.g. settings recommended by the camera manufacturer. In a practical situation the main reason for a user to initiate a restore operation is that the password has been misplaced or lost, or that the network settings have been set to non-functional values. If none of these issues prevails it is often considered more convenient to access the camera via a network and a user interface. There may be several levels of restore, yet generally the restore operation will result in all user configurations being deleted and replaced by the factory default. Some parameters having been updated since the camera left the factory may remain, such as a statistics log etc. in order to maintain service intervals. Furthermore, the settings corresponding to a restore state may be altered by for example upgrading the firmware of the network device 104, whereby a new factory default state is established.

The authorization device 102 is provided with a processing unit, such as a microprocessor or microcontroller 110, enabling communication and processing, and with a storage unit 112 for non-volatile storage of passwords, certificates, and optionally one or several restore profiles or restore profile identifiers etc.

Figure 2:
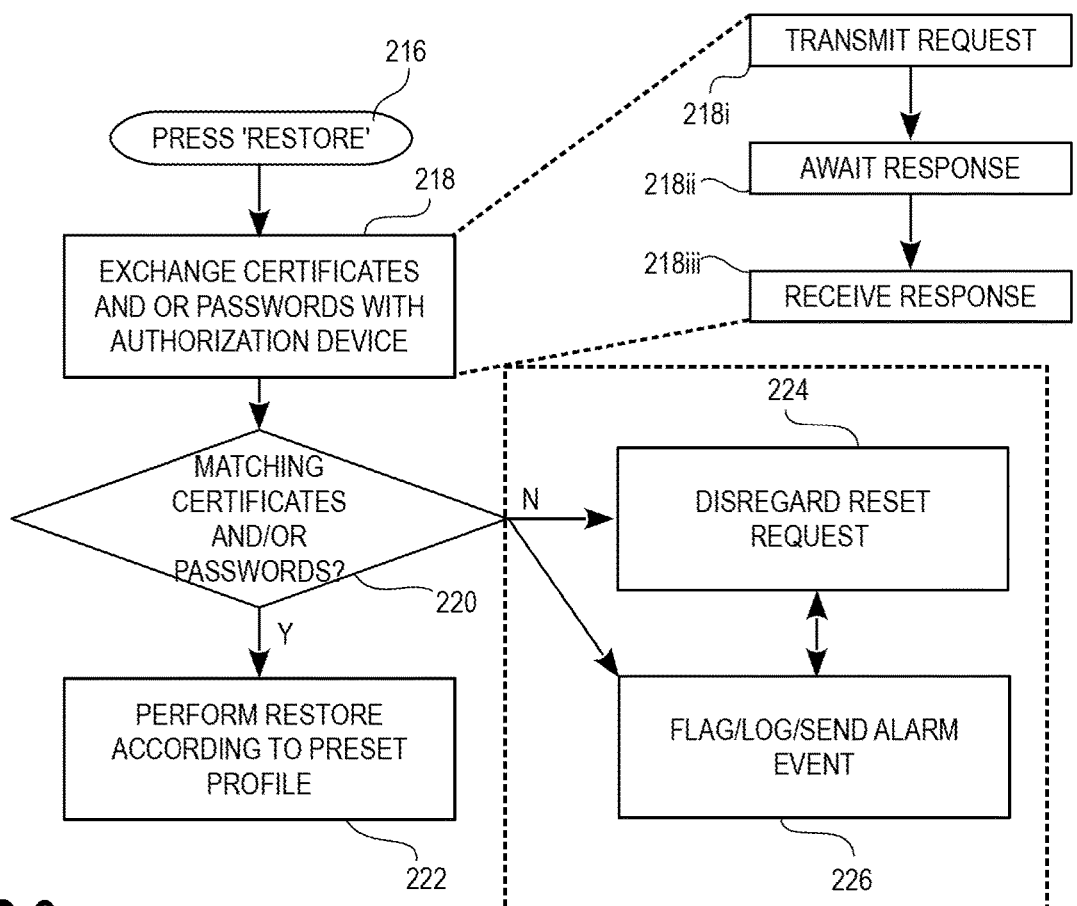
FIG. 2 is a flow chart of a method illustrating several embodiments of the present inventive method.

FIG. 2 illustrates a functional flow chart for a method according to one embodiment, and may be studied together with FIG. 1 for further understanding. According the method a restoring operation is initiated by actuation of a restore button (of some sort) 216. The intent of initiating a restoring operation is validated by communication between the camera and the authorization device 218. According to the present embodiment a previously installed certificate is available in the camera while another part of the certificate is arranged in the authorization device, and generally it concerns an asymmetric encryption process where a private key is arranged on the authorization device and a corresponding public key of a key pair is arranged on the camera.

In the present or other embodiments the initiation signal and the subsequent request may comprise sending a challenge from the camera to the authentication device. The challenge may be an encrypted salted truth. The authorization device provides a response in line with the challenge then by decrypting the challenge with a private key and encrypting the salted truth with the private key and returning it to the camera. The response may thus preferably be digitally signed or encrypted enabling for the camera to deduce that the response was provided by a particular, or at least a verified, authorization device (at a particular time), and this would be the goal irrespective of which technique is used. This basically follows a standard challenge/response authentication. In this way a replay attack, i.e. the use of old communication between the camera and the authorization device in a dubious purpose, may be blocked. In a situation where the challenge or request sent from the camera contains information that should be protected it may be encrypted. As indicated in relation to FIG. 1 the authorization device 102 is arranged immediately upstream the camera 104, in the sense that there are no switches or routers arranged therebetween. The camera communicates with the authorization device via a link layer protocol, whereby it is possible to verify that the authorization device is arranged in the direct network vicinity of the camera, i.e. on the same network segment. Still, it allows for communication via patch panels and cables which may simplify its practical implementation. Since these types of low level network packets are not routed the communication will stay within the network segment. This approach will induce a further level of security in that an operator will not only have to access the appropriate hardware, but also the appropriate location in order to initiate a restore operation. A further practical benefit with using communication over a link layer is that network parameters may have been set to a non-working state, disabling communication over a high-level protocol. A high-level protocol may need so called Ethernet addresses but the device may be so misconfigured that the Ethernet address is not working correctly or simply not known. Communication on the link-layer using for example so called mac-address which only is used locally within one network-segment will ensure that direct communication with the device will always be possible independent of device configuration.

If the restore initiation is verified in the above mentioned manner, a restore of the camera will be performed 222. The restore in this or any embodiment may be a restore to factory default, or a restore to any other preset restore profile, as has been discussed previously.

If the certificates or passwords do not match, or if no authorization device is detected, several different events may be initiated. In a case where a restore button is actuated inadvertently, in particular if the same button is used for actuation of other functions as well, a suitable action would then be to simply ignore the restore request 224, and not take any action at all. In other embodiments the restore request may be ignored 224 but added to a system log and/or generate a flag or event, or even an alarm 226, to notify an operator of possible tampering of the network device. This is indicated within the dotted rectangle of FIG. 2.

To summarize the actions of the authorization device in one or more basic embodiments, it will receive the authorization request, decrypt it if necessary. Following that, it will verify the request, construct an authorization response, encrypt it, and send it to the network connected devices.

Following the restore, the authorization device may be disconnected and the Ethernet cable may be reconnected to the network connected device, or the authorization device may optionally remain connected. After successful restore any certificate may have been removed from the product and needs to be installed again together with all other system specific settings like IP settings and system passwords, unless a restore profile comprising new system passwords and/or certificates is used.

Figure 3:
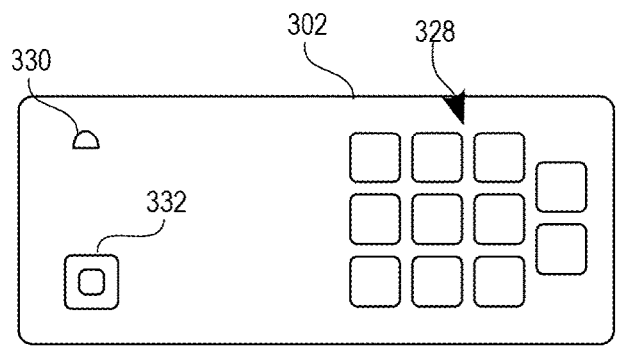
FIG. 3 is a schematic plan view of an authorization device according to an embodiment of the present invention.

FIG. 3 is a schematic plan view of an authorization device 302 according to one embodiment, actually illustrating a number of possible features that may be combined to form various different embodiments. The authorization device 302 may comprise a keypad 328, enabling a password protected functionality. In this context at least two different functionalities may be highlighted. The first is that access to the actual authorization device may be protected with a pincode or similar, such that only authorized personnel may be able to use it. The second is that a pincode may be included in the response to the camera, such that a restore may not be effected if the code is not known. These two may of course be used individually or in combination. The keypad may also be used for communication with the authorization device; examples include the selection of a particular restore profile, the entry of a pincode, etc. The particular restore profile may refer to an individual profile for a particular network connected device. A particular network connected device may have several restore profiles associated with it; one factory restore, suggestively being the default restore, and a number of other restore profiles based on user-defined settings or pre-installed settings. In one or many embodiments a restore to a profile different than the default profile comprises an initial restore to the default profile followed by an automatic configuration of parameters resulting in user-defined or tailor made profile.

A default profile may be updated over time in one or any embodiments. An example could include a default profile corresponding to a state in which the camera left the factory. This will be the default profile until there is provided a software release from the manufacturer, after which the default profile is updated with the software release or at least the relevant portions thereof.

The default profile is preferably stored on the camera, and any other profiles may be stored there as well, meaning that the authorization device may only have to communicate which profile to use (or merely confirming that a restore should be made), rather than an entire profile.

The authorization device may include an indicator light 330, such as an LED, for indicating various operating conditions. One example could be a (green) steady light signaling matching certificates, or a pulsating (green) light indicating processing in progress. A further indication could be one or several signals confirming that the camera has gone through the factory default successfully and rebooted correctly and that additions to the default profile has been installed.

A button 332 on the authorization device may be used to verify a restore, in that a restore initiation requires actuation of the button 332 for the restore to proceed. As for the restore button discussed in connection with the camera, the restore button 332 has another shape or form and the same examples apply. The button 332 or corresponding functionality on the authorization device may also be configured to generate the initiation signal starting the restore process. One advantage with such an arrangement is that the operator does not have to have immediate access to the camera. Surveillance cameras may often be located where they are difficult to access; at the top of a post, above a highway, below a bridge, above a railway, in a stairway, etc. In such an embodiment the button of the authorization device may be hardwired or programmed to take the role of the restore functionality of the camera, but it may also generate a first signal transmitted to the camera, the first signal triggering the initiation of a restore process.

Further features of the authorization device 102, 302 have been discussed referring to FIG. 1.

Figure 4:
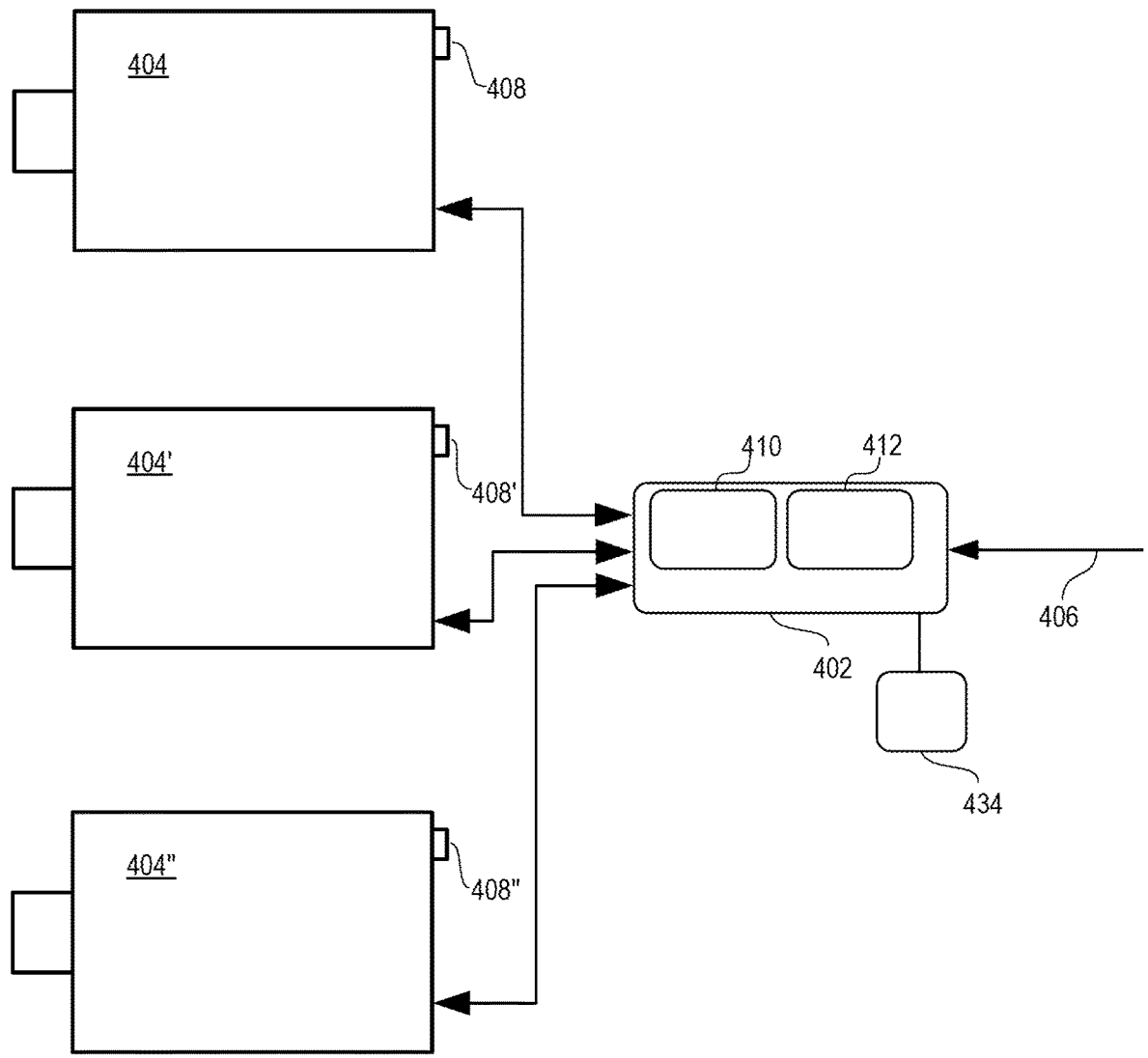
FIG. 4 is a schematic view illustrating an authorization device according to a further embodiment of the present invention, connected to several network connected devices in the form of cameras.

FIG. 4 illustrates an authorization device according to a further embodiment. In the illustrated embodiment, the most immediate difference is that the authorization device 402 enables output to several cameras, i.e. it comprises a multitude of connectors of the same type as the ones described in relation to previous embodiments, resulting in a number of channels available for connection of connected devices. There are three such channels in the illustrated embodiment, but there may be a lower or higher number available in a practical case. As the restore of a camera 404, 404', 404" is initiated, the function of the authorization device 402 will also be the same as already described in relation to earlier embodiments. An operator may communicate via a user interface, which may correspond to the typing of a pincode, the actuation of a button, or similar to verify a restore process, if such a verification is requested. In an embodiment each channel of the authorization device is associated with a LED light, such that a request for initialization from the camera results in signalling from the corresponding LED light, whereby a user may verify the request by pushing a button of the authorization device. There may also be one such button for each channel.

In an alternative embodiment, the user interface is realized via a secondary device 434 being connected to the authorization device 402. The secondary device may be a portable computer, a tablet, or another handheld device.

Throughout the detailed description the only example of a network connected device given has been a camera. This should not be construed as limiting the present teachings. It is readily understood that features characterizing for a camera are not essential for the functionality of the present teachings, and that the word "camera" may be replaced by any other headless device, including examples already provided as well as similar devices, without departing from the scope of the present teachings. Examples include physical access controller, network door stations, network card readers, network I/O relay modules, video encoders, routers, switches, network attached storage units, people detectors, object detectors, smoke detectors, various internet of things units such as network connected thermostats, lamps, environmental sensors, presence detectors, actuators, home appliances, microphones, loudspeakers, health monitors, i.e. basically any headless device having an Ethernet connection and a restore button and where the actuation of the restore button resets a password to a factory default.

It will be appreciated that a person skilled in the art can modify the above described embodiments in many ways and still use the advantages of the invention as shown in the embodiments above. Thus, the invention should not be limited to the shown embodiments but should only be defined by the appended claims Additionally, as the skilled person understands, the shown embodiments may be combined.

What is claimed is:

1. A method for restoring a setting on a network connected device, comprising:
   connecting an authorization device to the network connected device as an adjacent node on the network within a network segment;
   receiving, by the network connected device from the authorization device, within the network segment, over a low level link layer protocol, an initiation signal representing a request to restore the setting on the network connected device, wherein the initiation signal is triggered by the actuation of a restore button arranged on the authorization device;

transmitting, by the network connected device, a fully or partially encrypted request for authorization to restore the setting to the authorization device by transmitting the request for authorization over the low level link layer protocol, wherein the request for authorization is transmitted in response to the received initiation signal;

receiving, by the network connected device, a fully or partially encrypted restore authorization message from the authorization device over the low level link layer protocol in response to the transmitted request for authorization;

decrypting, by the network connected device, the received restore authorization message;

verifying, by the network connected device, the received restore authorization message; and restoring the settings on the network connected device if the received restore authorization message was verified.

2. The method of claim 1, wherein the network connected device is arranged to communicate with a dedicated authorization device only.

3. The method of claim 1, wherein the restore authorization message includes an identification code entered at the authorization device.

4. The method of claim 1, further comprising arranging a set of restore profiles identifiers onto the authorization device, thereby enabling restore to several different restore states and/or restore of several different network connected devices.

5. The method of claim 1, wherein the restore authorization response is digitally signed.

6. The method of claim 1, wherein restoring a setting comprises restoring the network connected device to a restore profile comprising a preset state for the network connected device, said preset state corresponding to a state in which it left a factory, or to such state altered by critical software updates, including a restore of a password for accessing the network connected device.

7. The method of claim 1, wherein the request for authorization is associated with a light emitting diode (LED) light on the authorization device, wherein the LED light is one of a plurality of LED lights on the authorization device, wherein each LED light is associated with a respective restore button arranged on the authorization device and a respective network connected device of a plurality of network connected devices connected to the authorization device, and wherein a respective initiation signal is triggered by the actuation of the respective restore button.

8. An authorization device for restoring a setting on a network connected device, said authorization device connected to the network connected device as an adjacent node on the network, within a network segment, and said authorization device comprising:
a controller;
a non-volatile storage for software and certificates;
a port, operatively connected to the controller and the non-volatile storage, for Ethernet communication with the network connected device;
the port configured to transmit, to the network connected device, within the network segment, via low level link layer packets, an initiation signal representing a request to restore the setting on the network connected device, wherein the initiation signal is triggered by the actuation of a restore button arranged on the authorization device;

the port configured to receive, from the network connected device via the low level link layer packets, a fully or partially encrypted request for authorization to restore the setting; and the port configured to transmit, to the network connected device via the low level link layer packets, a fully or partially encrypted restore authorization message, for restoring settings on the network connected device, to the network connected device in response to the received request for authorization.

9. The authorization device of claim 8, further comprising an indicator for indicating a status of a restore process.

10. The authorization device of claim 8, said authorization device comprising the restore initiation mechanism arranged on the authorization device, optionally in direct communication with the restore initiation mechanism arranged on the network connected device to be restored.

11. The authorization device of claim 8, further comprising a code entry device.

12. The authorization device of claim 8, further comprising a pass-through port for Ethernet communication, and optionally for power over Ethernet.

13. The authorization device of claim 8, wherein the restore authorization message includes an identification code entered at the authorization device.

14. The authorization device of claim 8, further comprising:
the controller and the non-volatile storage configured to arrange a set of restore profiles identifiers onto the authorization device, thereby enabling restore to several different restore states and/or restore of several different network connected devices.

15. The authorization device of claim 8, wherein the request for authorization is associated with a light emitting diode (LED) light on the authorization device, wherein the LED light is one of a plurality of LED lights on the authorization device, wherein each LED light is associated with a respective restore button arranged on the authorization device and a respective network connected device of a plurality of network connected devices connected to the authorization device, and wherein a respective initiation signal is triggered by the actuation of the respective restore button.

16. A system for restoring a setting of a network connected device, said system comprising:
the network connected device, connected to an authorization device as an adjacent node on the network, within a network segment, configured to receive, from the authorization device over a low level layer protocol, an initiation signal representing a request to restore the setting on the network connected device, wherein the initiation signal is triggered by the actuation of a restore button arranged on the authorization device;

the network connected device configured to transmit, to the authorization device over the low level link layer protocol, a fully or partially encrypted request for authorization to restore the setting is transmitted in response to the received initiation signal;

at the network connected device:
receiving a fully or partially encrypted restore authorization message from the authorization device over the low level link layer protocol in response to the transmitted request for authorization;
decrypting the received restore authorization message;
verifying the received restore authorization message; and restoring the settings on the network connected device if the received restore authorization message was verified.

17. The system of claim 16, wherein the network connected device is arranged to communicate with a dedicated authorization device only.

18. The system of claim 16, wherein the restore authorization message includes an identification code entered at the authorization device.

19. The system of claim 16, comprising arranging a set of restore profiles identifiers onto the authorization device, thereby enabling restore to several different restore states and/or restore of several different network connected devices.

20. The system of claim 16, wherein the request for authorization is associated with a light emitting diode (LED) light on the authorization device, wherein the LED light is one of a plurality of LED lights on the authorization device, wherein each LED light is associated with a respective restore button arranged on the authorization device and a respective network connected device of a plurality of network connected devices connected to the authorization device, and wherein a respective initiation signal is triggered by the actuation of the respective restore button.

* * * * *